US010698079B2

(12) United States Patent
Kushnir et al.

(10) Patent No.: US 10,698,079 B2
(45) Date of Patent: Jun. 30, 2020

(54) METHOD AND APPARATUS FOR PROXIMITY RADAR IN PHASED ARRAY COMMUNICATIONS

(71) Applicant: Intel IP Corporation, Santa Clara, CA (US)

(72) Inventors: Igal Kushnir, Hod-Hasharon (IL); Shmuel Ravid, Haifa (IL); Raanan Sover, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 725 days.

(21) Appl. No.: 15/088,478

(22) Filed: Apr. 1, 2016

(65) Prior Publication Data

US 2017/0290011 A1 Oct. 5, 2017

(51) Int. Cl.
*G01S 13/34* (2006.01)
*G01S 13/02* (2006.01)
*G01S 7/00* (2006.01)
*H01Q 3/36* (2006.01)
*H01Q 21/28* (2006.01)
*H01Q 21/29* (2006.01)
*H01Q 21/06* (2006.01)

(52) U.S. Cl.
CPC ............. *G01S 7/006* (2013.01); *G01S 13/34* (2013.01); *H01Q 3/36* (2013.01); *H01Q 21/28* (2013.01); *H01Q 21/293* (2013.01); *G01S 2013/0245* (2013.01); *H01Q 21/062* (2013.01); *H01Q 21/065* (2013.01)

(58) Field of Classification Search
None
See application file for complete search history.

(56) References Cited

U.S. PATENT DOCUMENTS

| 5,771,016 A | 6/1998 | Mullins et al. |
| 6,630,905 B1 | 10/2003 | Newberg et al. |
| 2008/0117117 A1* | 5/2008 | Washiro ............... H01Q 1/2225 343/850 |

(Continued)

FOREIGN PATENT DOCUMENTS

| DE | 112017001795 T5 | 1/2019 |
| WO | WO-0177706 A1 | 10/2001 |

(Continued)

OTHER PUBLICATIONS

"International Application Serial No. PCT/US2017/020116, International Search Report dated May 24, 2017", 3 pgs.

(Continued)

*Primary Examiner* — Vladimir Magloire
*Assistant Examiner* — Donald H B Braswell
(74) *Attorney, Agent, or Firm* — Schwegman Lundberg & Woessner, P.A.

(57) ABSTRACT

Embodiments relate to systems methods and computer readable media to enable a wireless communication device are described. In one embodiment a wireless communication device is configured for phased array communications. The wireless communication device comprises radar circuitry to detect objects that scatter a transmit radiated signal from the wireless communication device. Control circuitry is used to adjust the transmit radiated power of the phased array communications based on information provided by the radar circuitry.

25 Claims, 12 Drawing Sheets

(56) References Cited

U.S. PATENT DOCUMENTS

| | | | |
|---|---|---|---|
| 2008/0185903 A1* | 8/2008 | Bausov | E21C 27/24 299/1.2 |
| 2014/0218230 A1* | 8/2014 | Ostadrahimi | G01N 22/00 342/179 |
| 2016/0036519 A1* | 2/2016 | Loomis | H04B 7/22 370/316 |
| 2016/0204643 A1* | 7/2016 | Manova-Elssibony | H02J 50/20 320/108 |
| 2016/0327634 A1* | 11/2016 | Katz | G01S 7/4008 |
| 2017/0069957 A1* | 3/2017 | Kanno | H01Q 1/243 |

FOREIGN PATENT DOCUMENTS

| | | |
|---|---|---|
| WO | WO-0196901 A2 | 12/2001 |
| WO | WO-2014126289 A1 | 8/2014 |

OTHER PUBLICATIONS

"International Application Serial No. PCT/US2017/020116, Written Opinion dated May 24, 2017", 9 pgs.
"International Application Serial No. PCT/US2017/020116, International Preliminary Report on Patentability dated Oct. 11, 2018", 11 pgs.

\* cited by examiner

METHOD AND APPARATUS FOR PROXIMITY RADAR IN PHASED ARRAY COMMUNICATIONS

TECHNICAL FIELD

Embodiments pertain to wireless networks and wireless communication devices. Some embodiments relate to wireless local area networks (WLANs) and Wi-Fi networks including networks operating in accordance with the IEEE 802.11 family of standards, such as the IEEE 802.11ac standard, the IEEE 802.1 lax study group (SG) (named DensiFi) and WiGig. Other Embodiments pertain to mobile wireless communication devices such as the 4G and 5G cellular communication standards. The technical field more specifically pertains to regulatory Specific Absorption Rate (SAR) radiation requirements, RF exposure and Total Radiated Power limits and methods for compliance with those limits.

BACKGROUND

Wireless communications have been evolving toward ever increasing data rates (e.g., from IEEE 802.11a/g to IEEE 802.11n to IEEE 802.11ac). Currently, 5G and WiGig standards are being introduced for mobile wireless devices and Wireless Local Area Networks (WLAN) respectively. In high-density deployment situations, the utilization of available bandwidth becomes increasingly important. Already, there are methods of multiple access which allocate by frequency, time and code: Time Division Multiple Access (TDMA), Frequency Division Multiple Access (FDMA) and Code Division Multiple Access CDMA. A further method of multiple access is available by position, displacement or space. For example, the cellular system allows frequency re-use by mobile devices operating in different cells separated by a certain distance (usually the cell adjacent to an adjacent cell). Another method of Space Division Multiple Access (SDMA) is by using multiple antennas and directional antennas. Phased array antenna systems allow a device to electronically control the direction of transmitted power or the direction in which an antenna is sensitive. Since the direction is electronically variable, it can be adapted to a variety of environments. It can also provide a method to avoid radiating energy into a blocking object or a person. However, for that purpose, the wireless device has some method of determining the location of blocking objects or a person.

DETAILED DESCRIPTION

Embodiments relate to systems, devices, apparatus, assemblies, methods, and computer readable media to enhance wireless communications, and particularly to communication systems using phased array antennas. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments, and are intended to cover all available equivalents of the elements described.

Figure 1:
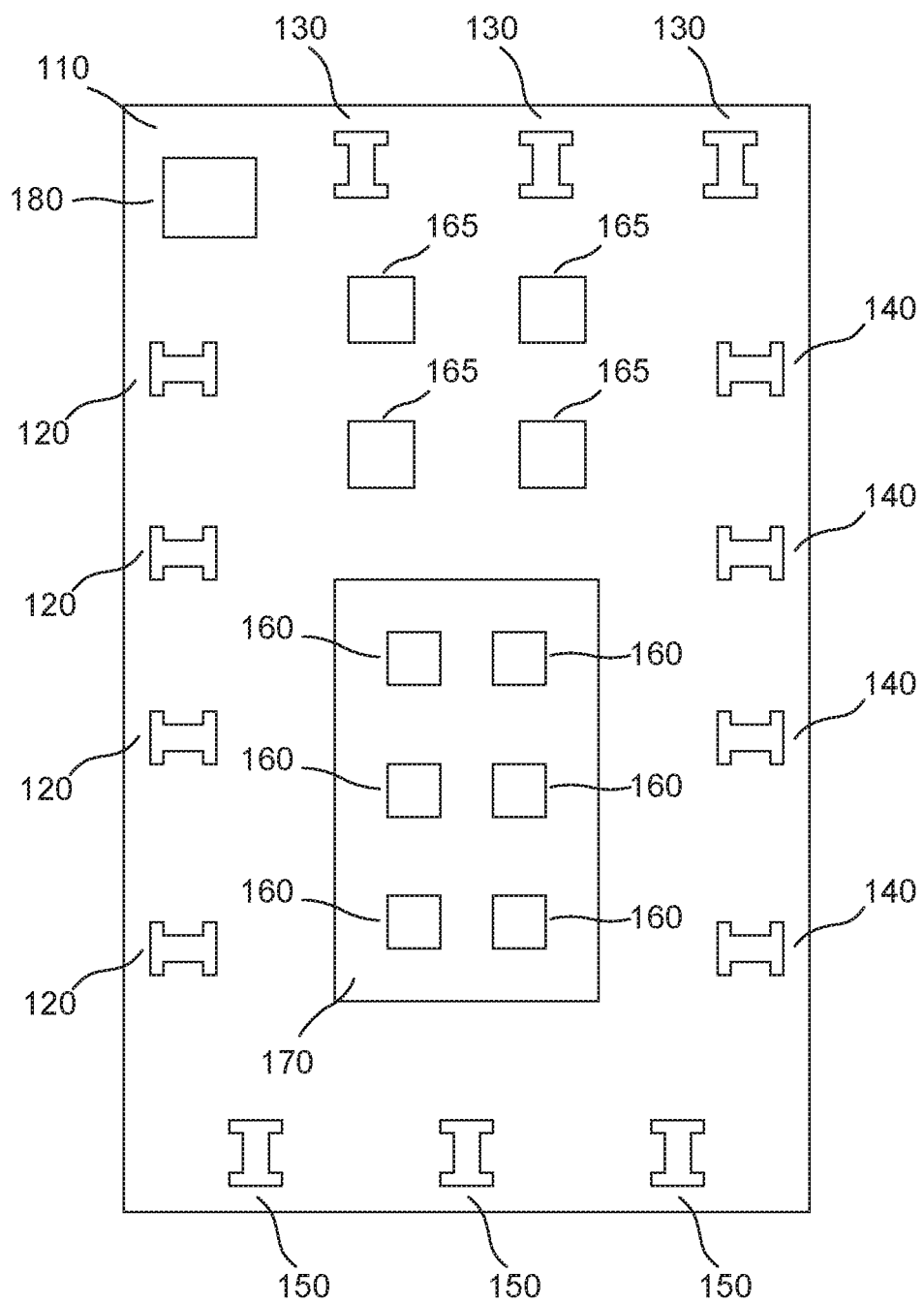
FIG. 1 illustrates a wireless mobile device comprising six phased array antenna modules for use with certain embodiments described herein.

FIG. 1 illustrates a wireless mobile device 110 comprising six phased array antenna modules for use with certain embodiments described herein. A four of the six phased array antenna modules are side mounted dipole antenna modules 120, 130, 140, and 150. The remainder of the six phased array antenna modules are patch antenna phased array antenna modules 160 and 165. Using the six antenna phased array modules, the device is capable of directed radiation in all 6 directions (Up, Down, North, South, East and West). Wireless mobile device also includes a Radio Frequency Integrated Circuit (RFIC) 170 and a coaxial connector 180. These elements of FIG. 1 illustrate an embodiment of how the phased array antenna modules can be arranged around other elements in the mobile device and still retain the ability to radiate and receive in all six directions.

Figure 2:
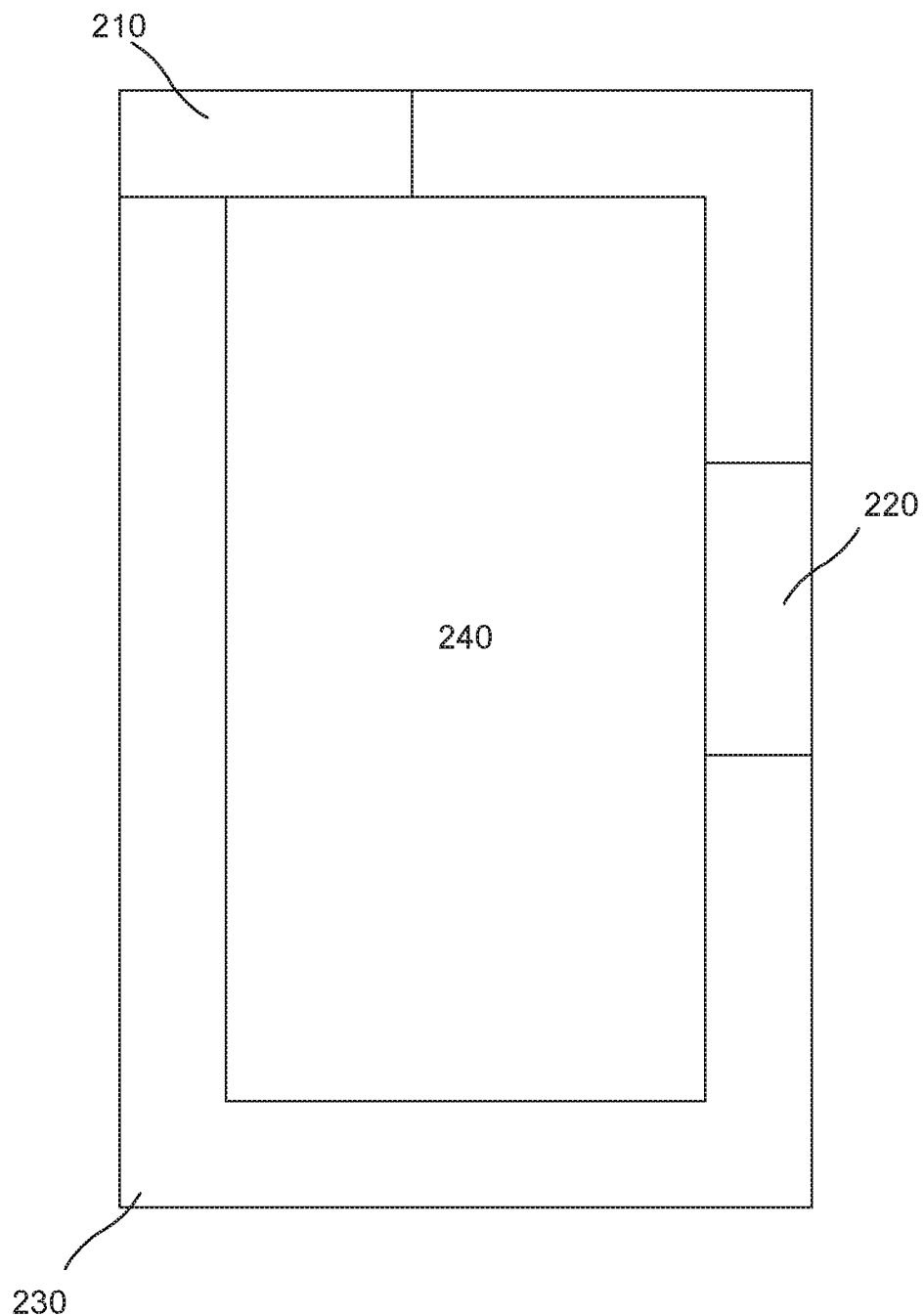
FIG. 2. illustrates a mobile wireless device with two phased array antenna elements, each with a corresponding Remote Front End Module (RFEM) in accordance with some embodiments described herein.

FIG. 2. illustrates a mobile wireless device 230 with two phased array antenna elements, each with a corresponding Remote Front End Module (RFEM) 210 and 220 in accordance with some embodiments described herein. The screen is also shown as element 240. The plurality of phased array antenna modules may be implemented to overcome blocking by a human body or an object. If one antenna is blocked, there would still be a strong likelihood that the other antenna is not. While this solves, to some extent, the problem of a blocked transmit signal, it does not stop the possibility of radiating power into a person. Further it does not prevent the power waste incurred by radiating into a blocking object.

Specific Absorption Rate (SAR) is a unit of measure for the amount of Radio Frequency (RF) power absorbed by the body when using an RF device operating below 6 GHz. SAR is used to measure the radiated power absorbed by MRI scans, mobile phones, wireless access points, microwave ovens among other devices. Other methods are used to measure RF exposure and Total Radiated Power above 6 GHz. The Federal Communications Commission (FCC) and other federal governmental agencies around the world operate such that any wireless device is evaluated to meet RF exposure limits.

One such method of addressing the SAR problem is to detect the presence of a signal blocker (such as a person) and alter the radiated power accordingly. Upon the detection of a blocking object or person, the phased array communication device could change the direction of the phased array antenna or re-distribute the transmit power to different phased array antenna modules that are not blocked. Various methods for proximity sensing exist that could be employed to perform such a function.

Figure 3:
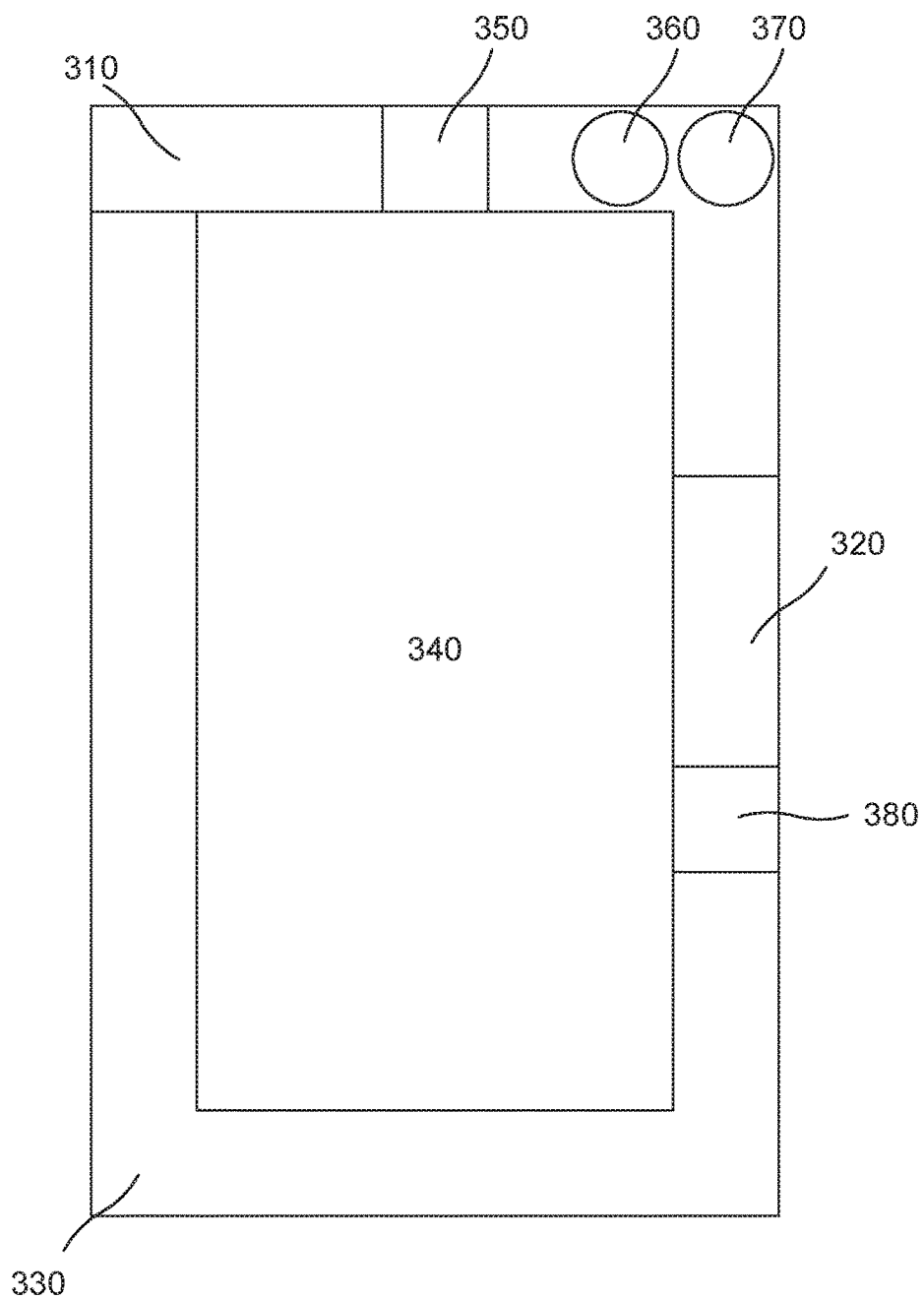
FIG. 3 is a drawing of a mobile device containing a plurality of proximity sensors to detect the location of nearby objects or of a person in accordance with some embodiments described herein.

FIG. 3 is a drawing of a mobile device 330 containing a plurality of proximity sensors to detect the location of nearby objects or of a person in accordance with some embodiments described herein. Mobile device 330 comprises a display 340, two phased array antenna modules 310 and 320 and a number of proximity sensors to determine if a blocking object is present. This includes a capacitive proximity sensor 350, a camera 360 which may possibly be used as some type of sensor, an infrared sensor 370 and another capacitive proximity sensor 380.

Proximity sensors can be implemented in a variety of ways. For example, capacitive proximity sensors rely on the electric field between the sensor and the target. The sensor is formed by one side of a parallel plate capacitor which is charged to produce an electric field. When a foreign object comes close enough to disturb the electric field, a dynamic capacitance is formed between the foreign object and the capacitive sensor. The disturbance is used to detect the proximity of a foreign object or a person. An inductive proximity sensor operates in much the same way except that the field is magnetic. There are other types including ultrasonic proximity sensors and infrared proximity sensors. However, they are impractical solutions for the intended application. Specifically, the cost of the sensors, the physical size of the sensors and their limited directionality make them less suitable.

Short range radar or a short range phased array radar does not suffer these drawbacks and is the preferred embodiment. A short range radar can emit low level radiation in a band that complies with FCC regulations (e.g. the ISM bands like 24 GHz or 61 GHz). As with any radar, a signal can be radiated from a transmit antenna and the echo or the reflected signal produced by a target can be sensed by a receiver. The nature of the echoed signal may provide information about the target including range, type of material etc. If the radar is implemented with a phased array system, it is capable of these measurements in multiple directions and can determine which phased antenna arrays are blocked and which directions those phased array antennas are blocked in. With that information, the gain of the phased array antenna module can be electronically redirected or the transmit power can be adjusted or redistributed to a different phased array antenna module so as to avoid the blocking object and ensure compliance with SAR regulations. Not only does this solution afford compliance with SAR regulations, it provides a method to avoid the reduction in the radiated power efficiency that would otherwise be incurred by radiating energy into a blocking objecting.

Since the phased array antenna may be blocked by an object or person within close proximity, the radar may be operating inside the near field radiation pattern. For example, at 24 GHz the wavelength in free space is 1.25 centimeters. Since a person could be as close or closer to the antenna array, near field coupling is likely. The near field coupling will produce a change or mismatch in the driving point antenna impedance. The incident wave upon the antenna would then be reflected instead of radiated due to the impedance mismatch. In either case of near field coupling or far field radiation, the detection of a reflected signal would indicate the presence of a blocking object.

The phased array radar can be implemented to cover some or all directions with inexpensive components and with a minimal physical foot print. Also, the phased array radar being described below in various embodiments uses similar devices as a wireless communication system. This allows for the practical incorporation and re-use of material, RF components, and antennas which will reduce the implementation cost. Further, by using the same phased array antenna, the radar can emulate the operating conditions that exist while communicating which may cause a SAR violation. The operating conditions while communicating include the location of the radiated source, the directivity of the radiated source and the type of radiation being emitted. This reduces the possibility of a missed detection or a false alarm. In some embodiments, other types of proximity sensors are placed in different locations within the wireless device and with a different directional sensitivity than the communication phased array antenna modules. Also other types of proximity sensors do not have the capability to range as accurately as the radar system described.

Figure 4:
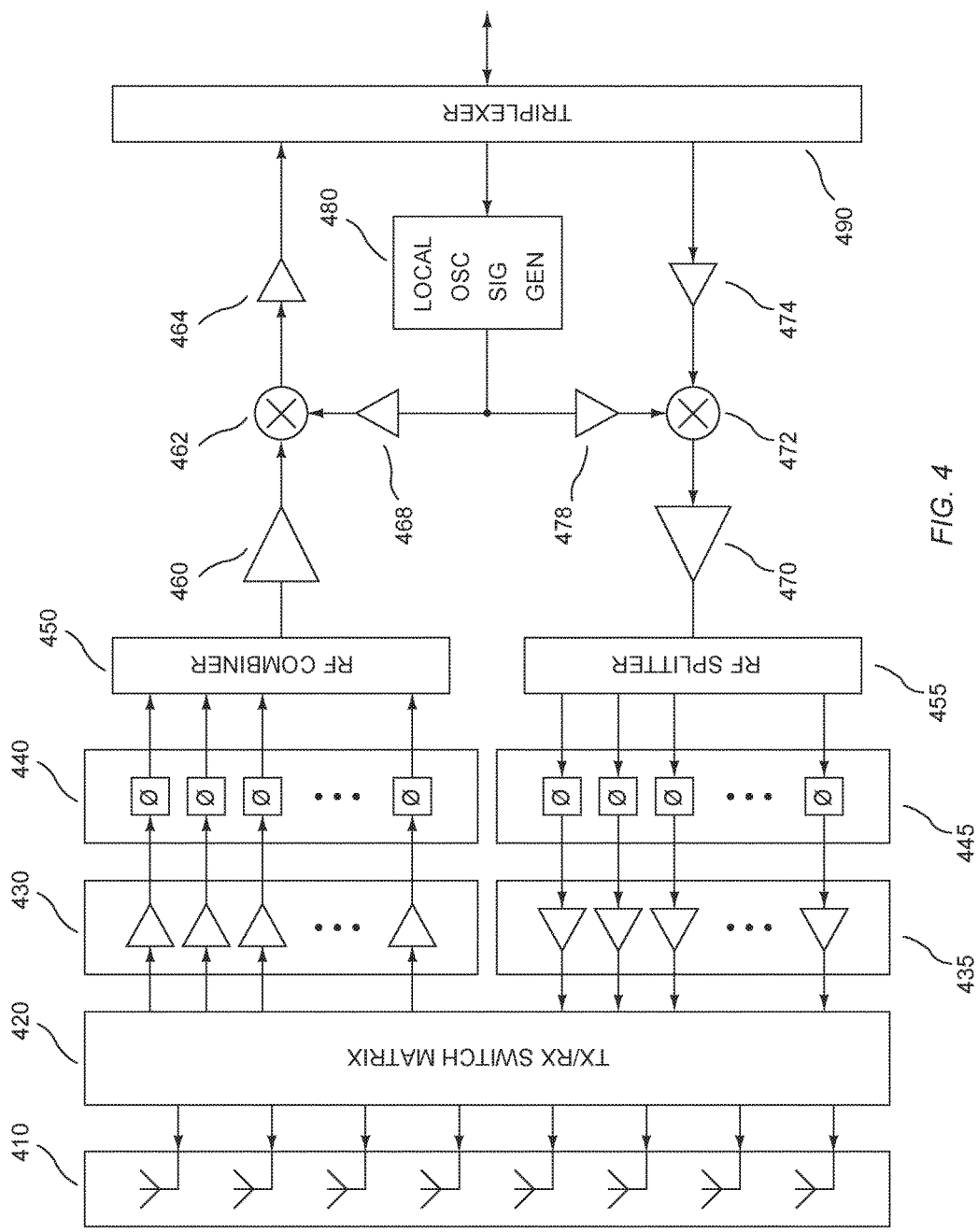
FIG. 4 shows a Radio Frequency (RF) phased array communication module including circuitry for up and down conversion to the Intermediate Frequency (IF) in accordance with some embodiments described herein.

FIG. 4 shows a Radio Frequency (RF) phased array communication module including circuitry for up and down conversion to the Intermediate Frequency (IF) in accordance with some embodiments described herein. The phased array antenna module 410 comprises a number of antenna elements, each of which can be connected through a switch matrix 420 to the transmit and receive chains. This way, each antenna element can be dynamically configured for transmitting or receiving. The switch matrix 420 is connected to a bank of Low Noise Amplifiers (LNA) 430 and a bank variable phase shifters 440. The outputs of the phase shifters are added together in the RF combiner 450. The output of the combiner is further amplified by the RF amplifier 460, down converted to the IF frequency by the down conversion mixer 462 and further amplified by the IF amplifier 464. Filtering stages that may be introduced anywhere through the receive chain are not shown. The down converted IF signal is passed through the triplexer to the baseband module shown in FIG. 5. The triplexer also feeds the IF transmit signal from the baseband module to the RFEM. The IF transmit signal is amplified through the IF amplifier 474, up converted through the up conversion mixer 472 and amplified again by the RF amplifier 470. Here the RF transmit signal is split into a plurality of transmit signal paths by the RF splitter 455. Each transmit signal path is adjusted by the phase shifters 445 and passed through RF power amplifiers 435. The RF transmit signals are then passed through the TX/RX switch matrix 420 to be radiated by elements in the phased array antenna module 410. As with the receive path, filtering may be introduced anywhere along the transmit chain and is not shown. Finally, the Local Oscillator (LO) signal is generated by the RF synthesizer 480 using a reference derived from the baseband module through the triplexer 490. The IF LO amplifiers 468 and 478 boost the LO signal to an appropriate level to drive the mixers. It is also possible to use dedicated antenna elements directly connected to the LNAs 430 and the Power amplifiers 435 and omit the switch matrix 420.

Figure 5:
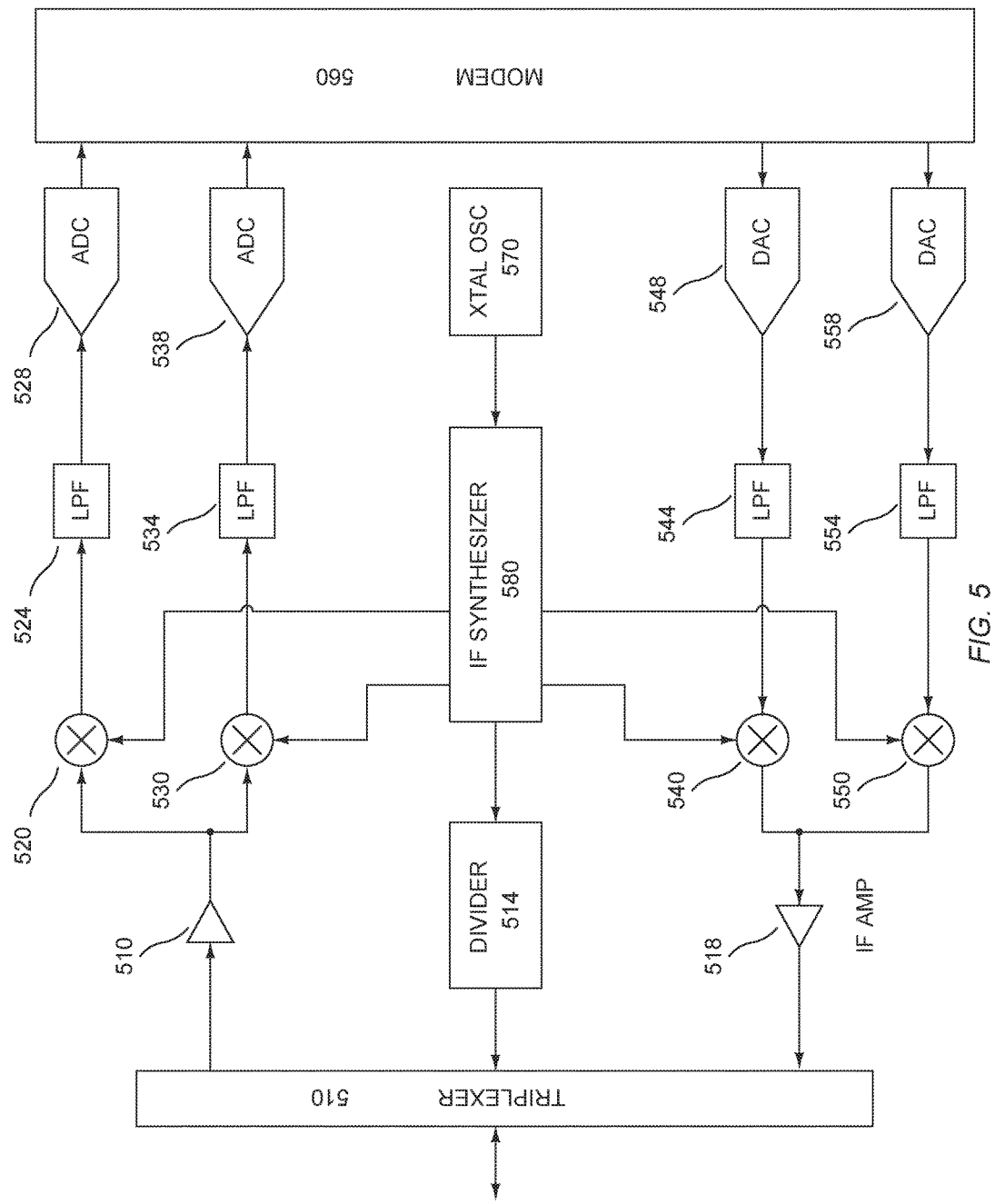
FIG. 5 shows the baseband receiver for the phased array communications in accordance with some embodiments described herein.

FIG. 5 shows the baseband receiver for the phased array communication system in accordance with some embodiments described herein. The triplexer 510 is used to pass a reference signal and a transmit signal to the RF module and also used to receive the receive signal from the RF module. The received signal is passed through another IF amplifier 510, through the down conversion mixers 520 and 530, filtered by the low pass filters 524 and 534 and converted through the Analog to Digital Converters (ADC) 528 and 538. The receive signal paths through 520 and 530 are for the in-phase and quadrature signal components respectively. These signals are passed to baseband modem 560 for detection. The baseband modem 560 also generates the baseband transmit signal which is converted to analog through the Digital to Analog Converters (DAC) 548 and 558, filtered by the low pass reconstruction filters 544 and 554, through the up conversion mixers 540 and 550. The In-Phase and Quadrature-Phase signal components from the up-conversion mixers 540 and 550 are added and amplified through the IF amplifier 518 and finally passed to the RF module through the triplexer 518. Finally, the local oscillator signals are generated from the crystal oscillator 570 and the IF synthesizer 580. The reference signal is generated from the IF synthesizer 580 through the frequency divider 515 and passed to the RF module through the triplexer 510. FIGS. 4 and 5 together show a representative phased array wireless communication system. This is not to exclude the multitude of variations that could be used such as a digital IF architecture or a direct conversion architecture. The functionality can be divided into various modules (here it is divided into a baseband module and an RF module) or it can be combined all together without using a triplexer to communicate between modules. The RF, IF and baseband devices can also be combined into multiple Integrated Circuits (ICs) in a number of different ways or can be all combined into a single RFIC.

Phased array communication Systems are becoming more and more prolific in wireless communications most notably in the WiGig and 5G standards for smartphones, tablets, laptops, WLAN access points and other wireless devices. A phased array communication system uses an array of antennas to steer the transmit signal in particular direction. The directional control is achieved by phase shifting the signal to each antenna so that in a certain direction, the transmitted signals add coherently or constructively. In other directions the transmitted signals add destructively, and the radiated power in those directions is reduced or nulled. In this way, the radiated energy can be focused and directionally controlled towards the target, or towards the receiver.

In a similar way the received signals from each antenna are phase shifted such that they add constructively when received from one direction, and they add destructively when received from another direction. It is the combination of the phase shift incurred by the difference in path delay between antennas and the phase shift introduced by the phase shifters that determine whether a signal in a particular direction is constructively or destructively added. In this manner the directionality of the antenna can be adjusted by changing the phase delay introduced by each phase shifter. The phased array antenna system is essentially a directional antenna in which the directivity of the antenna can be electronically altered or controlled. The control comes at a hardware cost of the additional antenna elements that comprise the phased array antenna module, the plurality of amplifiers (either LNAs or PAs), the plurality of variable phase shifters along with a power splitter on the transmit side and a power combiner to add the signals on the receive side. Further costs are to control the additional hardware. Never the less, the antenna elements are inexpensive and can be easily integrated into a wireless mobile device. And the additional circuit components can be incorporated into the Communication Radio Frequency Integrated Circuit (RFIC) making this a practical and beneficial method to implement a wireless communication system.

Figure 6:
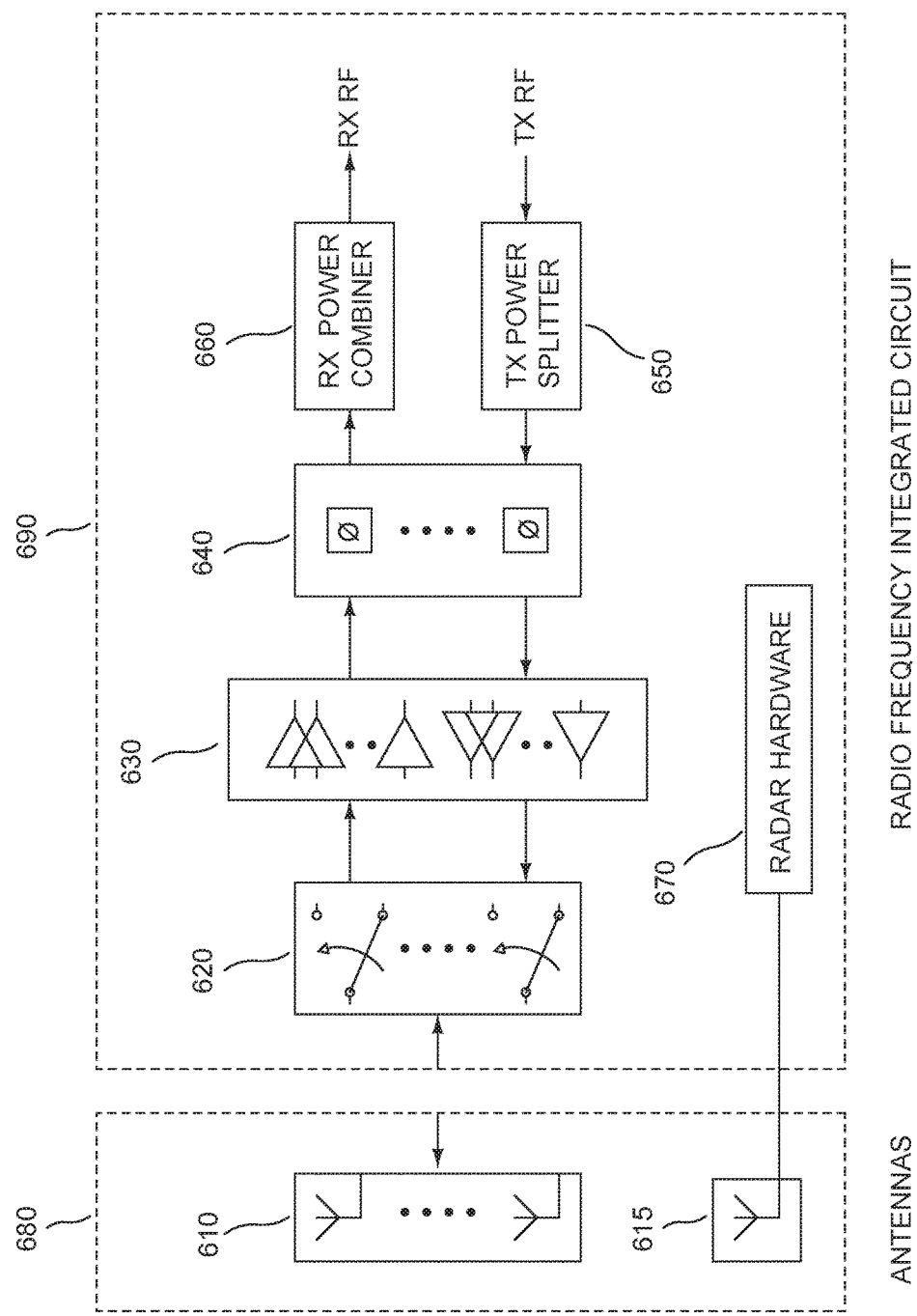
FIG. 6 a block diagram of a phased array Remote Front End Module (RFEM) implemented with radar circuitry for proximity detection in accordance with some embodiments.

FIG. 6 a block diagram of a phased array Remote Front End Module (RFEM) implemented with a radar system for proximity detection in accordance with some embodiments. The phased array RFEM consists of a phased array antenna module 610, a bank of switches 620 to connect the phased array module elements 610 for transmitting or receiving. It further comprises a bank of LNAs and PAs 630, a bank of phase shifters 640 to control the directivity, a Transmit (TX) power splitter 650 to divide the transmit signal into a plurality of transmit paths and a receive (RX) power combiner 660 to add the received signals from the phased array antenna module 610. The system also includes a radar antenna 615 and radar hardware 670. The radar antenna element 615 is drawn together with the antenna phased array 610 in a combined antenna module 680 to indicate similarity in material, size and position within the wireless communication device. Specifically, the radar antenna 615 could be physically built as part of the phased array antenna module 610. The radar hardware 670 is also drawn to indicate the similarity in circuit components with the communication system RFEM. Specifically, part of the radar system could be integrated into the radio frequency integrated circuit (RFIC) 690. It is clear that the additional antenna and the additional hardware could be included with very little additional cost and with a very small physical footprint.

Figure 7:
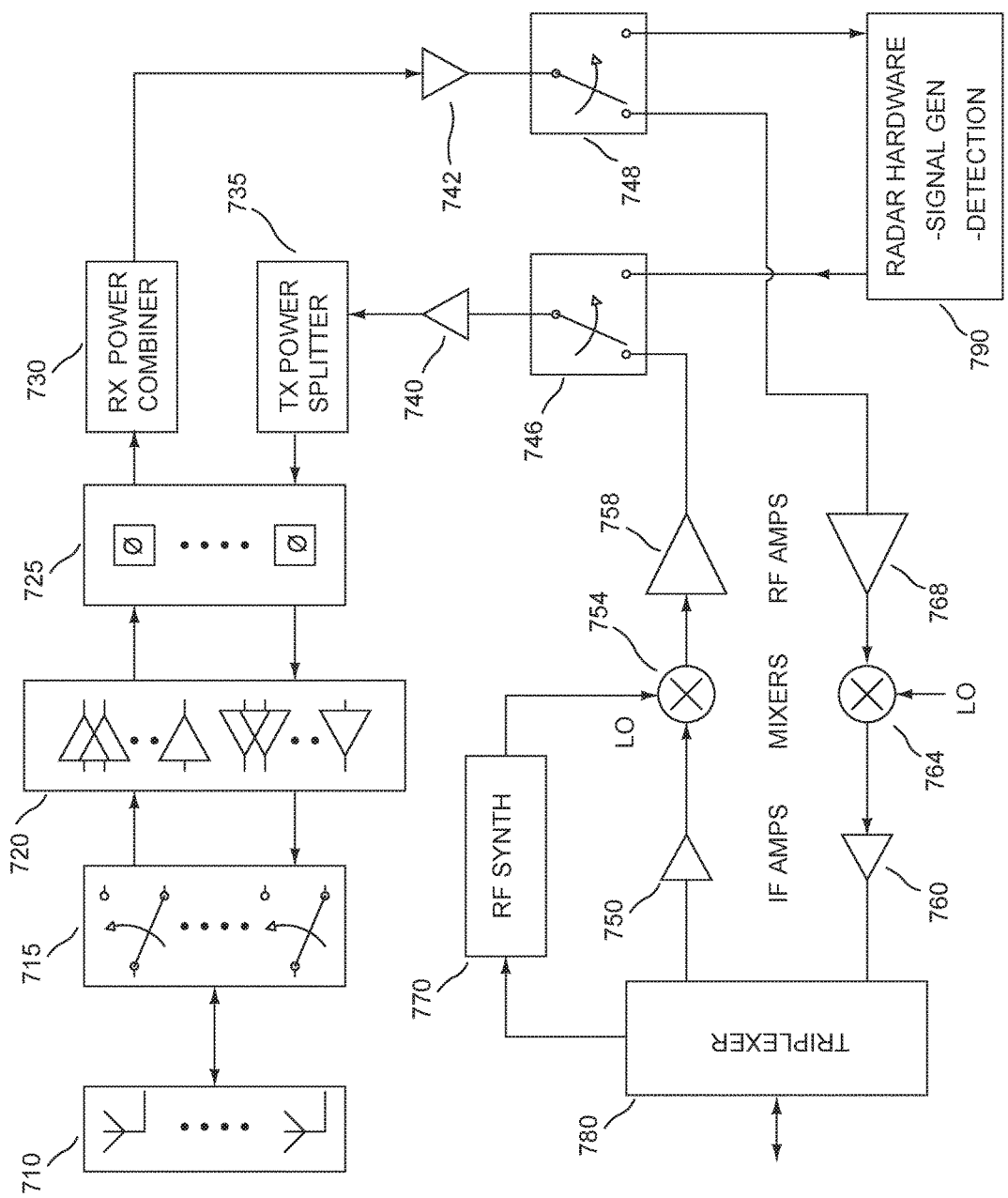
FIG. 7 is a block diagram of a phased array RFEM that is utilized for communications and for radar in accordance with some embodiments described herein.

FIG. 7 is a block diagram of a phased array RFEM that is utilized for communications and for radar in accordance with some embodiments described herein. In this embodiment, the radar system re-uses the communication phased array antenna module for the radar antenna. It also re-uses the RFEM of the phased array communication system. The phased array communication system is comprising a phased array antenna 710, a switch matrix 715 to connect different antenna elements for transmit or receive mode of operation, a bank of LNA's and PA's 720, a bank of phase shifters 725, an RX combiner 730, and a TX splitter 735. The operation of these elements is the same as that described in FIG. 4. However, the input of the TX power splitter 735 is connected to an RF switch 746 through an RF amplifier 740. Similarly, the output of the RX power combiner 730 is connected to an RF switch 748 through an RF amplifier 742. The RF switches 746 and 748 can be set to allow the phased array antenna module and the RFEM to be used by either the communication system or the Radar system. The communication system operates as described earlier with FIG. 4. It is comprising IF amplifiers 750 and 760, Mixers 754 and 764, RF amplifiers 758 and 768, an RF synthesizer 770, a Triplexer 780 and a radar hardware module 790. Clearly, the re-use of the phased array antenna module and the RFEM to implement a radar system represents a considerable reduction in hardware.

Figure 8:
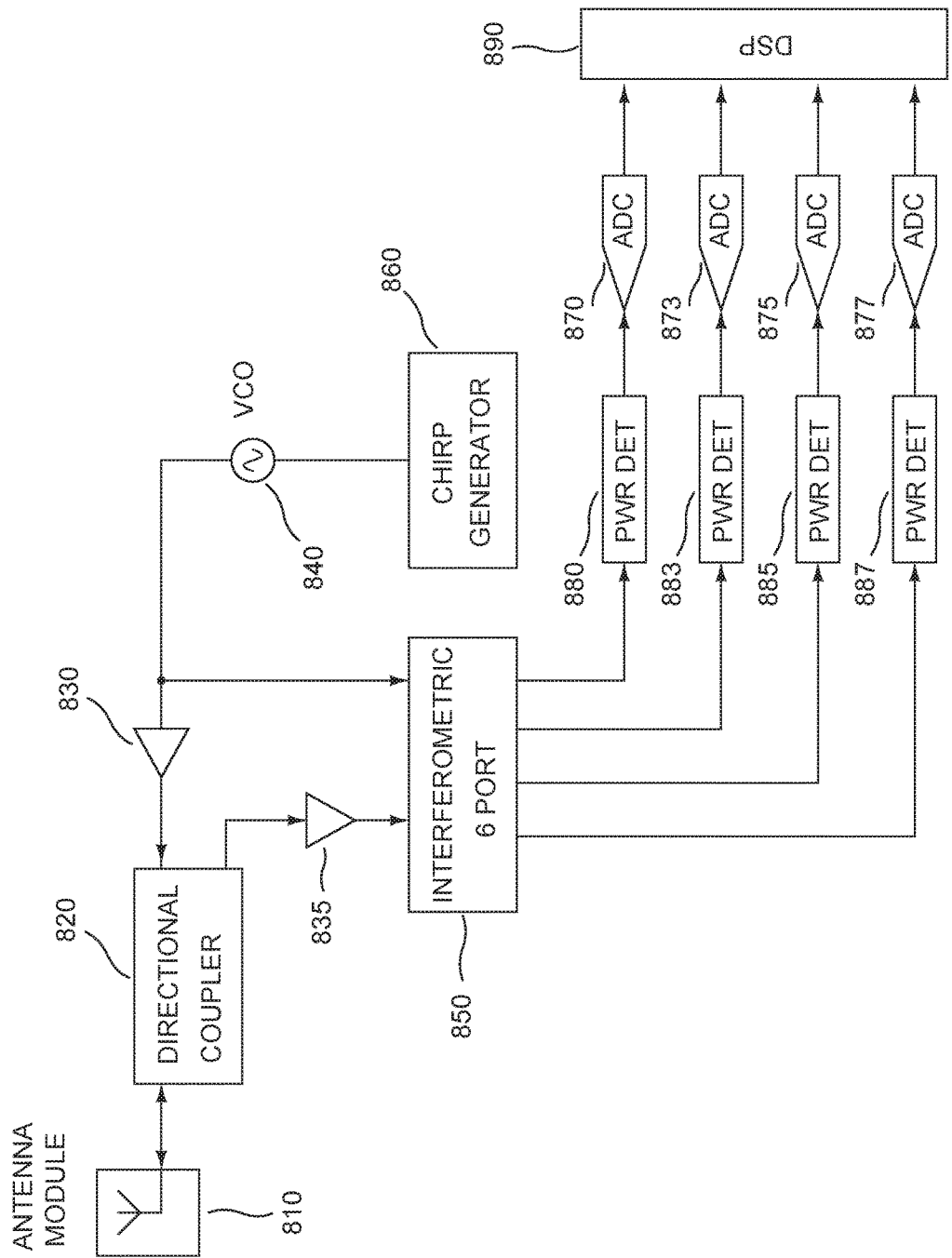
FIG. 8 shows a basic radar system that can be configured for Continuous Wave (CW) radar in accordance with some embodiments.

FIG. 8 shows a basic radar system that can be configured for Continuous Wave (CW) radar in accordance with some embodiments. The basic operation of a radar is that a signal is radiated from an antenna. The signal radiates outwardly in space until it encounters an object. At that point, the radiated wave is scattered meaning some of the radiation enters or is transmitted through the object and some of the radiation is reflected by the object. The characteristics of the object such as the size of the object, the shape of the object and the type of material the object is made of determine how much radiated energy is absorbed or transmitted through the object and how much radiated energy is reflected by the object. The radiated energy that is reflected back towards the transmitter is called the back scatter. The reflected signal or scattered signal is received by the radar and processed. This processing involves the extraction of information from the reflected signal such as reflected power, range, Doppler and so on.

For CW radar, the transmitted signal is a constant frequency tone generated by the VCO 840 while holding the output of the chirp generator 860 constant. This is amplified by the RF power amplifier 830, and connected to the antenna 810 through the directional coupler 820. The transmitted carrier wave is reflected back by an object to the antenna module 810. The received reflected signal is passed through the directional coupler to the low noise amplifier (LNA) 835. The low noise amplifier output and the VCO output are connected to the passive interferometric six port device 850. This device adds the input signals from the VCO and from the LNA at four relative phase offsets and provides an output for each; 0, 90, 180 and 270 degrees. Depending on the phase difference between the VCO output and the reflected signal, each output of the six port 850 will constructively or destructively add by varying amounts. The phase difference can then be determined by the power of each output from 850 using power detectors 880, 883, 885, and 887. The power is sensed by the ADCs 870, 873, 875 and 877 and processed in DSP 890. A range can then be determined from the phase difference between the transmitted signal and the reflected signal. The outputs can also provide a measure of the strength of the reflection which can help in determining the degree to which a blocking object is present. The accuracy of the range detection depends on the accuracy of the power detectors and the calibration.

In some embodiments, the reflected signal will clearly be stronger if an object is closer to the transmitter and usually larger objects will also reflect more energy. This information may be used to determine if the phased array antenna module is blocked. In FIG. 8, filters that would be used for frequency selection and to improve sensitivity are not shown. As previously discussed, the possibility also exists for the blocking object to reside within the near field radiation pattern of the antenna. In this case, the antenna will exhibit a different driving point impedance as seen by the transmitter. The transmit wave will then be reflected by the mismatched impedance which can also serve as a method to determine if a blocking object is present.

In the radar system described in FIG. 8, a directional coupler 820 is used to isolate the transmit and receive signals. This is necessary because the transmitter and the receiver operates simultaneously and at the same frequency. Therefore, without sufficient isolation, the TX signal could bleed through to the receive path and be mistaken for a reflected signal. By using the directional coupler 820, the transmit and receive signals are separated or isolated by the direction of energy flow. The directional coupler could be implemented by a parallel line coupler, a 90 degree hybrid coupler, a circulator or any other device that provides directional isolation.

In the previous embodiment using CW radar, there is a range ambiguity problem. It is not known if the measured phase difference wraps around one or more times as it travels to the target and back. In another embodiment, a Continuous Wave Frequency Modulated (CWFM) radar could be implemented. Here the chirp generator creates a ramping "chirp" which FM modulates the transmitted signal. The round trip time required for the transmit signal to propagate to the target object, reflect and propagate back to the receiver is called the time of flight. The range to the target is then known from the time of flight and the speed with which the signal propagates (the speed of light for RF radiation in free space). The reflected signal will return oscillating at the same frequency it was transmitted. Since the VCO frequency is increasing or ramping up at a constant rate during the time of flight, there is a direct relationship between the time of flight and the frequency delta between the received frequency and the transmit frequency. By comparing the current VCO frequency and the reflected signal frequency the range to target can be estimated without the range ambiguity problem described above.

As described herein, a "return" signal refers to any reflection, scattering, near field coupling, or any other such signal that is identified from a transmit radiated signal of a device. A return signal thus refers to radiation from the device, and does not refer to a signal from another device.

Figure 9:
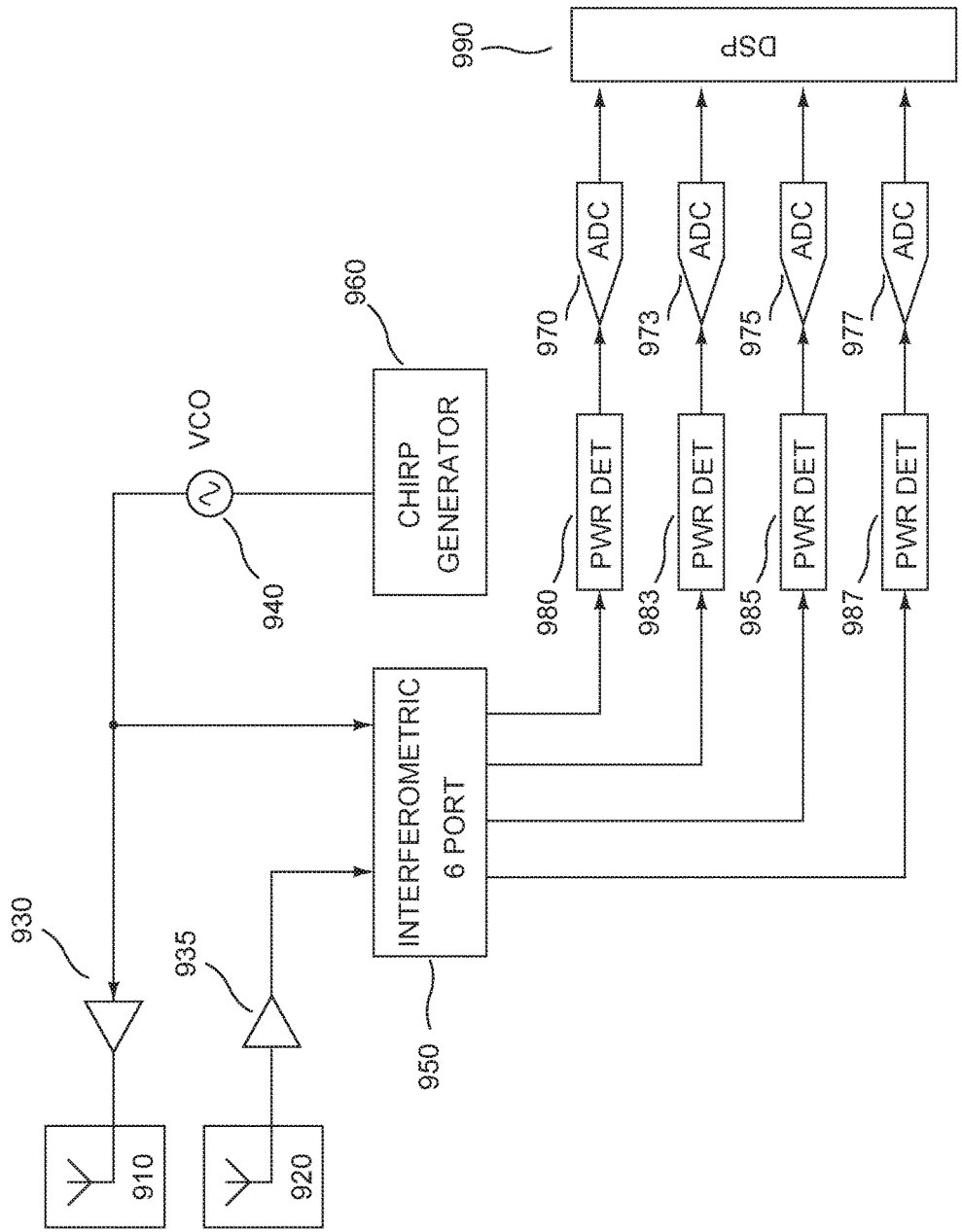
FIG. 9 shows another embodiment of a radar system similar to that of FIG. 8, but using a separate transmit antenna and receive antenna with no directional coupler in accordance with some embodiments.

FIG. 9 shows another embodiment of a radar system similar to that of FIG. 8, but using a separate transmit antenna 910 and receive antenna 920 with no directional coupler in accordance with some embodiments. However, in this embodiment, rather than using a directional coupler 820 to isolate the transmit and receive signals, a separate transmit antenna 910 and receive antenna 920 are used. If the antenna characteristics and arrangement or separation of the antennas are sufficient to provide enough isolation, this is a viable alternative. The hard ware operates identically to that shown in FIG. 8. The radar hardware is comprising a power amplifier 930, an LNA 935, a Voltage Controlled Oscillator (VCO) 940, passive interferometric six port device 950, a chirp generator 960, power detectors 980, 983, 985 and 987, Analog to Digital Converters (ADC) 970, 973, 975 and 977 and a DSP module 990.

The types of radar described above and the hardware shown is not to limit the scope of the embodiments. Other types of radar and other methods of generating and detecting can also be implemented using the method and hardware re-use described herein. The embodiments described above can be modified in a variety of ways. For example, in one embodiment, the radar antenna module 615 may be connected to a directional coupler to simultaneously support transmit and receive operation on the same antenna elements. Or the radar antenna module 615 may incorporate a transmit and a receive antenna. Here again, the radar antenna module 615 can be designed as part of the phased array communication antenna 610 providing minimal spatial separation. In another embodiment, the phased array communication antenna 710 could be slightly modified and re-used for radar operation. The transmit communication mode of the phased array antenna 710 could also be used to transmit the radar signal. The transmitted radar signal would be radiated from the same position and in the same direction as the transmit communication signal. Then additional antenna elements added to the phased array antenna module 710 could be used for receiving the reflected signal. In this way, the system could partially implement a phased array radar where the directivity of the transmit radar signal is electronically controlled. Or the opposite approach could be implemented where the additional antenna elements included in 710 could be used for transmitting the radar signal and the remaining antenna elements in 710 could be used as a phased array receive antenna as they are used in communication mode.

In further variations of the embodiments described above, the hardware and antenna modules could be added to operate the phased array communication system and the radar system simultaneously. Further still, it may be possible to perform the radar detection using the reflection of transmit communication signal. In yet another embodiment, the RF synthesizer 770 could be used to generate the CW transmit radar signal and with slight modifications could also be used to generate the FMCW transmit signal. The similarity between radar systems and communication systems and between phased array radar systems and phased array communication systems offer the opportunity to combine and re-use elements of each system in many different ways.

Figure 10:
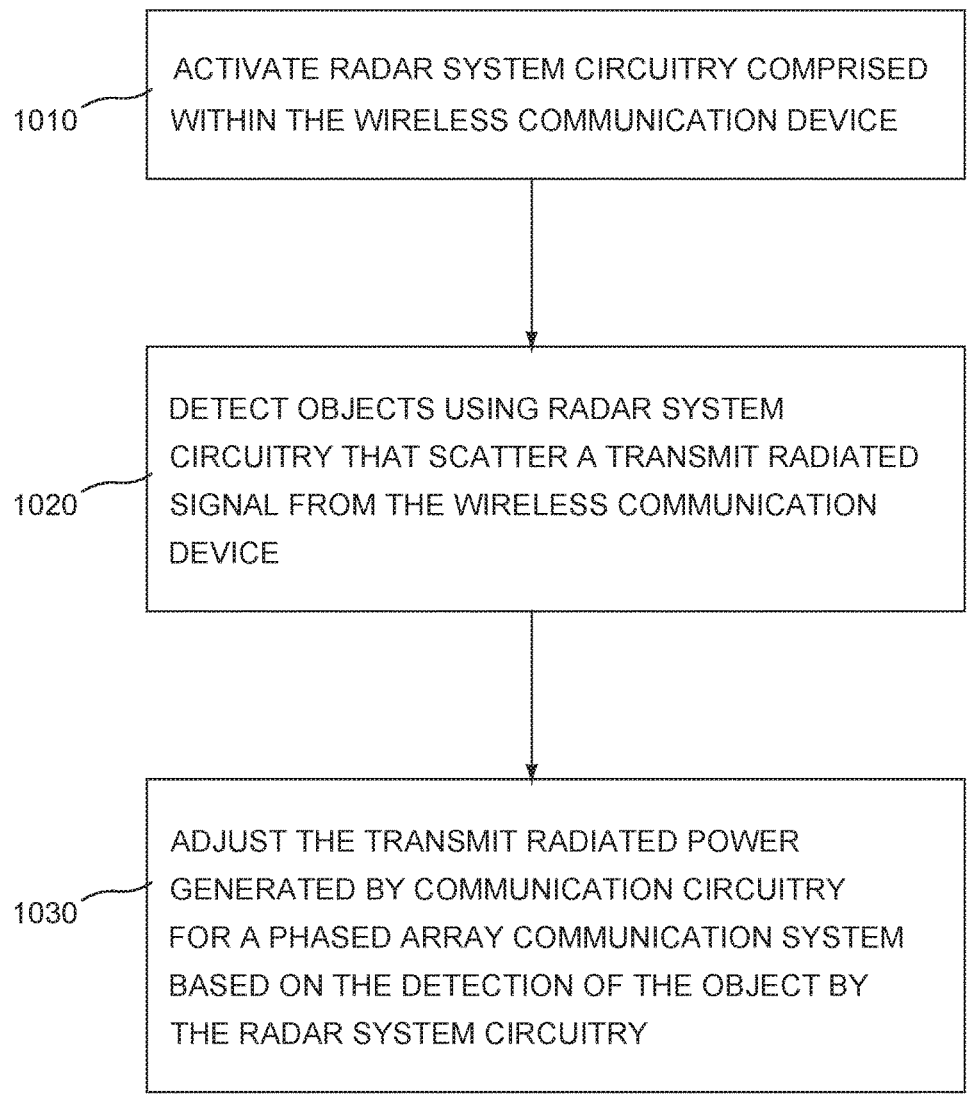
FIG. 10 is an operational flow chart for the proximity detection and adjustment of a phased array wireless communication system in accordance with some embodiments described herein.

FIG. 10 is an operational flow chart for the proximity detection and adjustment of a phased array wireless communication system in accordance with some embodiments described herein. In the first operation 1010, the wireless communication device activates a radar built into the wireless communication device. The radar may use the same antennas as used for communication or it may use certain antenna elements within a phased array antenna module that is normally used for wireless communication or it may use its own dedicated antenna. The radar circuitry may be implemented in the same radio frequency integrated circuit (RFIC) as the communication circuitry or at least a part of the communication circuitry. It may also be implemented in a separate RFIC. The radar circuitry could even re-use some of the same circuitry that is normally used for communication.

In operation 1020, the radar system detects an object that is blocking or scattering a transmit radiated signal from the wireless communication device. This may be detected by a signal reflecting back from the object (the back scatter). It may also detect the reflection resulting from near field coupling between the antenna and the blocking object. In this case, the near field coupling introduces a variation in antenna impedance which results in a mismatch between the antenna and the antenna feed. The mismatched load causes a reflection on the antenna feed which the radar system can detect. The determination of near field coupling or far field radiation depends on the wavelength (known by the frequency and relative permittivity through which the object is electromagnetic wave is travelling), the distance or range between the antenna and the object and the size and shape of the antenna and the object.

In operation 1030, the transmit radiated power of the phased array communication system is adjusted depending on the location, range and amount of reflected power of the blocking object. The adjustment could involve a simple reduction in total transmit power to a particular phased array antenna module. The adjustment could redistribute the power to different phased array antenna modules, which could involve simply switching on antenna module off and switching another antenna module on. The radiated power adjustment may also include a directional adjustment to one or more of the phased array antenna modules. The goal of the adjustment is to ensure compliance with SAR regulations and radiation exposure limits and also to avoid power waste by radiating energy into a blocking object while communicating.

EXAMPLES

In various embodiments, methods, apparatus, non-transitory media, computer program products, or other implementations may be presented as example embodiments in accordance with the descriptions provided above. Certain embodiments may include UE such as phones, tablets, mobile computers, or other such devices. Some embodiments may be integrated circuit components of such devices. In various other devices, various combinations of hardware circuitry, firmware, and software are used to implement the spur cancellation as described herein. In some embodiments, functionality may be on a single chip or multiple chips in an apparatus.

Example 1 is an apparatus of a wireless communication device, the apparatus comprising: communication circuitry for phased array communications configured to be coupled to one or more phased array antenna modules, the one or more phased array antenna modules comprising a plurality of antenna elements; transmit circuitry configured to transmit a transmit radiated signal; radar circuitry configured to detect a return signal from the transmit radiated signal from the wireless communication device; and control circuitry to initiate an adjustment to a transmit radiated power of the communication circuitry based on the return signal detected t by the radar circuitry.

In Example 2, the subject matter of Example 1 optionally includes wherein each phased array antenna module of the one or more antenna modules comprises a corresponding plurality of antenna elements; and wherein the radar circuitry is further configured to detect a portion of the return signal as a reflected signal caused by a change in antenna impedance due to a near field coupling effect between the phased array antenna module and an object; and wherein the control circuitry is configured to determine that the object is within a threshold proximity of the wireless device based on the change in antenna impedance.

In Example 3, the subject matter of any one or more of Examples 1-2 optionally include wherein the adjustment to the transmit radiated power adjusts the wireless communication device to comply with regulatory Specific Absorption Rate (SAR) and RF exposure radiation limits.

In Example 4, the subject matter of any one or more of Examples 1-3 optionally include wherein the radar circuitry is configured for Continuous Wave (CW) radar or Continuous Wave Frequency Modulation (CWFM) chirped radar.

In Example 5, the subject matter of any one or more of Examples 1-4 optionally include wherein the radar circuitry is configured to operate in an Industrial, Scientific and Medical (ISM) radio band.

In Example 6, the subject matter of any one or more of Examples 1-5 optionally include wherein the transmit circuitry is configured to be coupled to at least a portion of the plurality of antenna elements; and wherein the transmit circuitry transmits the transmit radiated signal using the portion of the plurality of antenna elements.

In Example 7, the subject matter of any one or more of Examples 1-6 optionally include wherein at least a portion of the communication circuitry for phased array communications and at least a portion of the radar circuitry comprise a Radio Frequency Integrated Circuit (RFIC).

In Example 8, the subject matter of any one or more of Examples 1-7 optionally include wherein at least a portion of the one or more of the phased array antenna modules that are coupled to the communication circuitry are also coupled to the radar circuitry; and wherein the portion of the one or more of the phased array antenna modules are used to detect the return signal as a scattered portion of the transmit radiated signal.

In Example 9, the subject matter of any one or more of Examples 1-8 optionally include further comprising a transmit radar antenna coupled to the transmit circuitry and configured to radiate the transmit radiated signal, wherein the radar circuitry comprises the transmit circuitry; and a return radar antenna coupled to the radar circuitry and configured to receive the return signal.

In Example 10, the subject matter of any one or more of Examples 1-9 optionally include further comprising an RF synthesizer, wherein the RF synthesizer is configured to be used by the communication circuitry for phased array communications; and wherein the RF synthesizer is further configured to be used by the radar circuitry.

In Example 11, the subject matter of any one or more of Examples 1-10 optionally include wherein the adjustment to the transmit radiated power of the phased array communication includes a transmit power adjustment to one or more of the phased array antenna modules.

In Example 12, the subject matter of any one or more of Examples 1-11 optionally include wherein the adjustment to the transmit radiated power of the phased array communication includes a directional adjustment for one or more of the phased array antenna modules.

In Example 13, the subject matter of any one or more of Examples 1-12 optionally include wherein the communication circuitry and the radar circuitry are configured to operate simultaneously.

In Example 14, the subject matter of Example 13 optionally includes wherein the transmit radiated signal comprises a data signal generated as part of the communication circuitry.

In Example 15, the subject matter of any one or more of Examples 1-14 optionally include wherein the device is a mobile wireless communication device further comprising a touchscreen interface.

Example 16 is an apparatus of a wireless communication device comprising communication circuitry configured to be coupled to one or more antenna modules, radar circuitry configured to detect a return signal from a transmit radiated signal, wherein the transmit radiated signal is from the wireless communication device; and control circuitry to initiate an adjustment to a transmit radiated power of the wireless communication device based on the detection of the return signal by the radar circuitry.

In Example 17, the subject matter of Example 16 optionally includes wherein detecting the return signal comprises detecting a reflected signal caused by a change in an antenna impedance due to a near field coupling effect between the antenna module and an object.

In Example 18, the subject matter of any one or more of Examples 16-17 optionally include wherein the adjustment to the transmit radiated power configures the wireless communication device to comply with regulatory Specific Absorption Rate (SAR) and RF exposure radiation limits.

In Example 19, the subject matter of any one or more of Examples 16-18 optionally include wherein the adjustment to the transmit radiated power comprises an adjustment to a total transmit power adjustment for the wireless communication device.

Example 20 is a non-transitory computer readable medium comprising instructions that, when executed by one or more processors of a device comprising a wireless communication device, cause the wireless communication device to: activate radar circuitry of the wireless communication device; detect reflections from the transmit radiated signal using the radar circuitry the wireless communication device; and adjust a transmit radiated power generated by communication circuitry for phased array communications based on the detection of the object by the radar circuitry.

In Example 21, the subject matter of Example 20 optionally includes that further causes the radar circuitry to detect an object using the return signal and at least a part of the one or more phased array antenna modules.

In Example 22, the subject matter of any one or more of Examples 20-21 optionally include that further causes the radar circuitry to detect an object using the return signal and at least a part of the communication circuitry.

Example 23 is a method for proximity radar detection with phased array communications in a wireless device, the method comprising: radiating a transmit radiated signal; detecting, using radar circuitry, a return signal, wherein the return signal comprises a partial scattered portion of the transmit radiated signal from the wireless device, the wireless device comprising communication circuitry for the phased array communications configured to be coupled to one or more phased array antenna modules, each of the one or more phased array antenna modules comprising a plurality of antenna elements; and adjusting a transmit radiated power of the phased array communications based on the detection of the return signal by the radar circuitry.

In Example 24, the subject matter of Example 23 optionally includes further comprising: detecting a user action using an input of the wireless device prior to radiating the transmit radiated signal; communicating with a network via the transmitted radiated signal, wherein the transmitted radiated signal comprises a data transmission from the wireless device to the network.

In Example 25, the subject matter of Example 24 optionally includes further comprising: adjusting a power for the data transmission as part of adjusting the transmit radiated power in response to detection of the object.

Example 26 is a non-transitory computer readable medium comprising instructions that, when executed by one or more processors of a device comprising a wireless communication device and one or more communication phased array antenna modules, cause the wireless communication device to: activate radar system circuitry comprised within the wireless communication device; detect an object using the radar system circuitry that scatters a transmit radiated signal from the wireless communication device; and adjust a transmit radiated power generated by communication circuitry for a phased array communication system based on the detection of the object by the radar system circuitry.

In Example 27, the subject matter of Example 26 optionally includes that further causes the wireless communication device to comply with regulatory Specific Absorption Rate (SAR) and RF exposure radiation limits.

In Example 28, the subject matter of any one or more of Examples 26-27 optionally include that further causes the wireless communication device to detect the object within a near field of a phased array antenna module using the radar system circuitry, wherein the radar system circuitry is configured to detect a reflected signal caused by a change in a driving point impedance of an antenna module due to a near field coupling effect between the antenna module and the object.

In Example 29, the subject matter of any one or more of Examples 26-28 optionally include that further causes the wireless communication device to transmit continuous wave (CW) radar signals or continuous wave frequency modulated (CWFM) chirp radar signals.

In Example 30, the subject matter of any one or more of Examples 26-29 optionally include that further causes the wireless communication device to transmit radar signals at a frequency within an Industrial, Scientific and Medical (ISM) radio band.

In Example 31, the subject matter of any one or more of Examples 26-30 optionally include that further causes the wireless communication device to transmit radar signals from one or more radar antenna elements comprised within a communication phased array antenna module.

In Example 32, the subject matter of any one or more of Examples 26-31 optionally include that further causes the radar system circuitry to detect the object by transmitting or receiving radio frequency signals using at least a part of the communication phased array antenna module.

In Example 33, the subject matter of any one or more of Examples 26-32 optionally include that further causes the wireless communication device to perform radar proximity detection wherein at least a part of the communication circuitry is also used to implement at least a part of the radar system circuitry.

In Example 34, the subject matter of any one or more of Examples 26-33 optionally include that further causes the wireless communication device to perform radar proximity detection wherein one or more of the communication phased array antenna modules used for the phased array communication system are also used to implement at least a part of a phased array radar.

In Example 35, the subject matter of any one or more of Examples 26-34 optionally include that further causes the wireless communication device to adjust the transmit radiated power by adjusting a total radiated power of one or more of the communication phased array antenna modules.

In Example 36, the subject matter of any one or more of Examples 26-35 optionally include that further causes the wireless communication device to communicate with the communication circuitry and radar detect with the radar system circuitry, simultaneously.

Example 37 is a phased array communication system of a wireless communication device comprising: means for communicating, using communication circuitry coupled to one or more phased array antenna modules, wherein the phased array antenna modules comprise a plurality of antenna elements; means for detecting an object, using radar system circuitry, that scatters a transmit radiated signal from the wireless communication device; and means for adjusting a transmit radiated power of the phased array communication system based on the detection of the object by the radar system circuitry.

In Example 38, the subject matter of Example 37 optionally includes further comprising the means to detect the object inside a near field of one or more phased array antenna modules using the radar system circuitry that is configured to sense a change in a phased array antenna module impedance due to a near field coupling effect between the phased array antenna module and the object.

In Example 39, the subject matter of any one or more of Examples 37-38 optionally include further comprising the means to adjust the transmit radiated and cause the wireless communication device to comply with regulatory Specific Absorption Rate (SAR) and RF exposure radiation limits.

In Example 40, the subject matter of any one or more of Examples 37-39 optionally include further comprising the means to transmit continuous wave (CW) radar signals or continuous wave frequency modulated (CWFM) chirp radar signals.

In Example 41, the subject matter of any one or more of Examples 37-40 optionally include further comprising the means to transmit radar signals in an Industrial, Scientific and Medical (ISM) radio band.

In Example 42, the subject matter of any one or more of Examples 37-41 optionally include further comprising the means to use the radar system circuitry wherein at least a part of the radar system circuitry is implemented in an RFIC that is also used to implement the communication circuitry.

In Example 43, the subject matter of any one or more of Examples 37-42 optionally include further comprising the means to use radar antenna elements that are built into the communication phased array antenna module when detecting the object using the radar system circuitry.

In Example 44, the subject matter of any one or more of Examples 37-43 optionally include further comprising the means to perform radar proximity detection using one or more of the communication phased array antenna modules.

In Example 45, the subject matter of any one or more of Examples 37-44 optionally include further comprising the means to perform radar proximity detection wherein at least a part of the communication circuitry is also used to implement at least a part of the radar system circuitry.

In Example 46, the subject matter of any one or more of Examples 37-45 optionally include the communication circuitry and the radar system circuitry are configured to run simultaneously.

Example 47 is a method for proximity radar detection in a phased array communication system of a wireless device, the method comprising: radiating a transmit radiated signal; detecting, using radar system circuitry, an object that scatters the transmit radiated signal from the wireless device, the wireless device comprising communication circuitry for the phased array communication system coupled to one or more phased array antenna modules, each of the one or more phased array antenna modules comprising a plurality of antenna elements; and adjusting a transmit radiated power of the phased array communication system based on the detection of the object by the radar system circuitry.

In Example 48, the subject matter of Example 47 optionally includes further comprising adjusting the transmit radiated power such that the wireless device complies with regulatory Specific Absorption Rate (SAR) and RF exposure radiation limits.

In Example 49, the subject matter of any one or more of Examples 1-48 optionally include wherein the radar system circuitry is configured for Continuous Wave (CW) radar or Continuous Wave Frequency Modulation (CWFM) chirped radar.

An example of any method above implemented as a computer readable medium comprising instructions that, when executed by one or more processors of a device comprising a digital phase locked loop, perform the method.

Further, in addition to the specific combinations of examples described above, any of the examples detailing further implementations of an element of an apparatus or medium may be applied to any other corresponding apparatus or medium, or may be implemented in conjunction with another apparatus or medium. Thus, each example above may be combined with each other example in various ways both as implementations in a system and as combinations of elements to generate an embodiment from the combination of each example or group of examples. For example, any embodiment above describing various elements may be implemented as circuitry with additional connected elements, and may be implemented multiple times and connected in various different ways within a single device or integrated circuit. Similarly, methods, apparatus examples, and computer readable medium examples may each have a corresponding example of the other type even if such examples for every embodiment are not specifically detailed.

Figure 11:
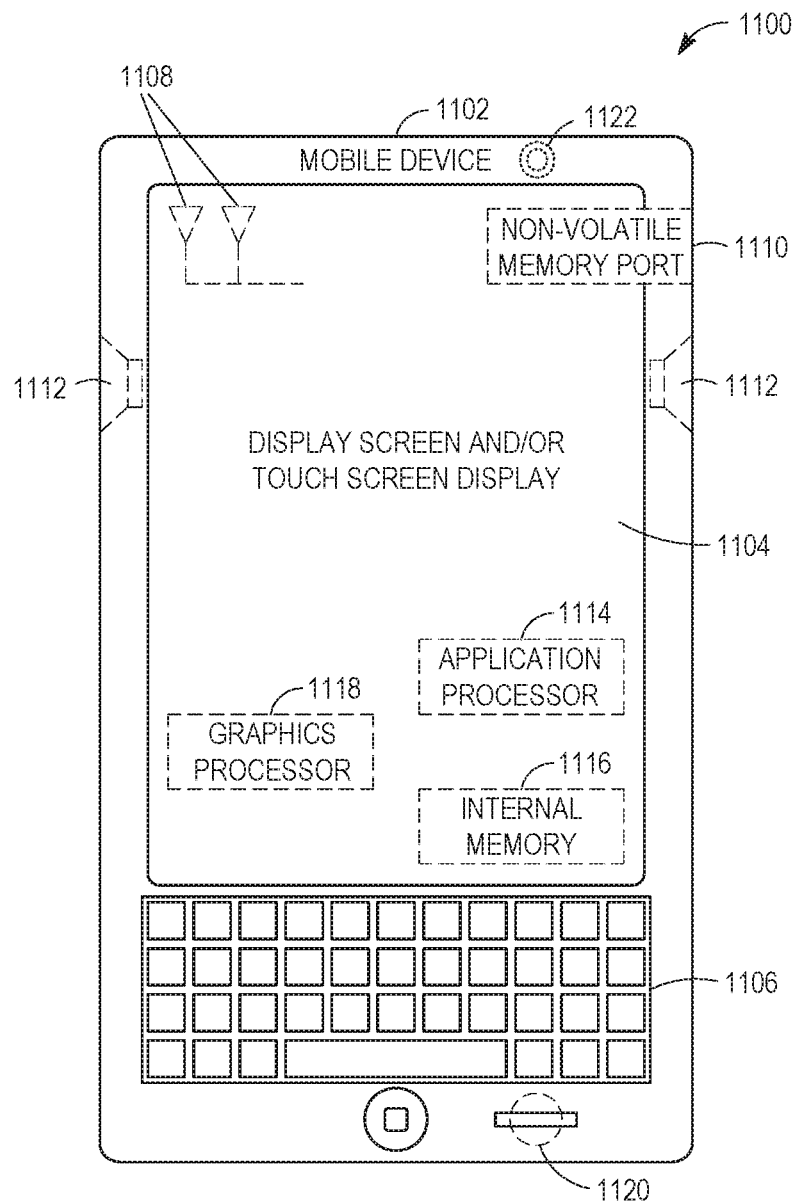
FIG. 11 illustrates an example of a device 1100, which may be a phased array communication system including circuitry to transmit and receive signals and a short range proximity radar in accordance with some embodiments.

FIG. 11 illustrates an example of a device 1100, which may be a phased array communication system including circuitry to transmit and receive signals and a short range proximity radar in accordance with some embodiments. The device 1100 can be any mobile device, a mobile station (MS), a mobile wireless device, a mobile communication device, a tablet, a handset, laptop, wireless access point or other type of wireless communication device. The device 1100 can include one or more antennas 1108 within housing 1102 that are configured to communicate with a hotspot, base station (BS), an evolved node B (eNB) for cellular network access, or other type of WLAN or WWAN access point. The device may thus communicate with a WAN such as the Internet via a network, access point, or base station. The device 1100 can be configured to communicate using multiple wireless communication standards, including standards selected from 3GPP LTE, WiMAX, High Speed Packet Access (HSPA), Bluetooth, and Wi-Fi standard definitions. The device 1100 can communicate using separate antennas for each wireless communication standard or shared antennas for multiple wireless communication standards. The device 1100 can communicate in a WLAN, a WPAN, and/or a WWAN.

FIG. 11 also shows a microphone 1120 and one or more speakers 1112 that can be used for audio input and output from the device 1100. A display screen 1104 can be a liquid crystal display (LCD) screen, or other type of display screen such as an organic light emitting diode (OLED) display. The display screen 1104 can be configured as a touch screen. The touch screen can use capacitive, resistive, or another type of touch screen technology. An application processor 1114 and a graphics processor 1118 can be coupled to internal memory 1116 to provide processing and display capabilities. A non-volatile memory port 1110 can also be used to provide data input/output options to a user. The non-volatile memory port 1110 can also be used to expand the memory capabilities of the device 1100. A keyboard 1106 can be integrated with the device 1100 or wirelessly connected to the device 1100 to provide additional user input. A virtual keyboard can also be provided using the touch screen. A camera 1122 located on the front (display screen) side or the rear side of the device 1100 can also be integrated into the housing 1102 of the device 1100.

Figure 12:
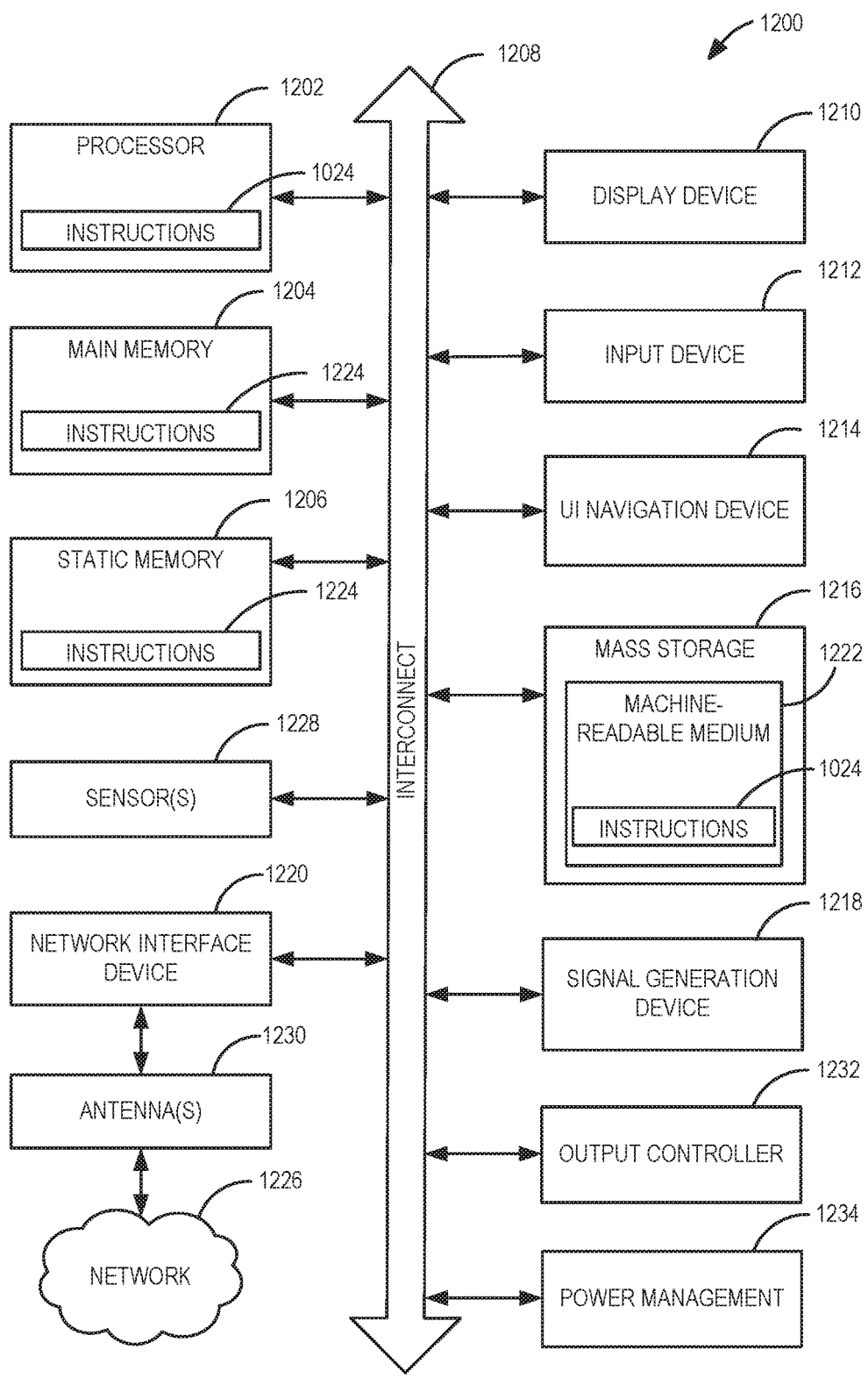
FIG. 12 is a block diagram of a computer system machine that is used to implement a device in some implementations of the various embodiments described herein.

FIG. 12 is a block diagram of a computer system machine 1200 that is used to implement a device in some implementations of the various embodiments described herein. Computer system machine 1200 or elements of computer system machine 1200 may be used to implement any device, a mobile phone, tablet, laptop wireless access point, wireless station device or any other such device described herein. In various other embodiments, different device components or multiple of any element may be used in different devices. Some embodiments may include other elements, such as phased array antennas, RF components for communication and radar, or other such elements integrated with any of the elements described herein for machine 1200. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 1200 includes a processor 1202 (e.g., a central processing unit (CPU), a graphics processing unit (GPU) or both), a main memory 1204 and a static memory 1206, which communicate with each other via an interconnect 1208 (e.g., a link, a bus, etc.). The computer system machine 1200 can further include a video display unit 1212, an alphanumeric input device 1212 (e.g., a keyboard), and a user interface (UI) navigation device 1214 (e.g., a mouse). In one embodiment, the video display unit 1212, input device 1212 and UI navigation device 1214 are a touch screen display. The computer system machine 1200 can additionally include a storage device 1216 (e.g., a drive unit), a signal generation device 1218 (e.g., a speaker), an output controller 1232, a power management controller 1234, and a network interface device 1220 (which can include or operably communicate with one or more antennas 1230, transceivers, or other wireless communications hardware), and one or more sensors 1228, such as a Global Positioning Sensor (GPS) sensor, compass, location sensor, accelerometer, or other sensor. In some embodiments, for example, an input or sensor such as 1228 receives data or an input from a user that indicates that the user is using the device. In response, the device may shift into a mode which periodically performs a radar operation to determine if the device is close to the user's body. In such embodiments, when the device determines that it is not in use or not likely to be close to the user's body, either through a user input on a touchscreen or a sensor operation (e.g. determining that the device is stationary for more than a threshold time using a motion sensor.)

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, static memory 1206, and/or within the processor 1202 during execution thereof by the computer system machine 1200, with the main memory 1204, static memory 1206, and the processor 1202 also constituting machine-readable media.

While the machine-readable medium 1222 is illustrated in an example embodiment to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 1224 can further be transmitted or received over a communications network 1226 using a transmission medium via the network interface device 1220 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

Various techniques, or certain aspects or portions thereof may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 1002.11, and Bluetooth communication standards. Various alternative embodiments may use a variety of other WWAN, WLAN, and WPAN protocols and standards can be used in connection with the techniques described herein. These standards include, but are not limited to, other standards from 3GPP (e.g., HSPA+, UMTS), IEEE 1002.16 (e.g., 1002.16p), or Bluetooth (e.g., Bluetooth 9.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM). Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. An apparatus of a wireless communication device, the apparatus comprising:
   communication circuitry for phased array communications configured to be coupled to one or more phased array antenna modules, the one or more phased array antenna modules comprising a plurality of antenna elements;
   transmit circuitry configured to transmit a transmit radiated signal;

radar circuitry configured to detect a return signal from the transmit radiated signal from the wireless communication device; and control circuitry to initiate an adjustment to a transmit radiated power of the communication circuitry based on the return signal detected t by the radar circuitry;

wherein each phased array antenna module of the one or more antenna modules comprises a corresponding plurality of antenna elements; and wherein the radar circuitry is further configured to detect a portion of the return signal as a reflected signal caused by a change in antenna impedance due to a near field coupling effect between the phased array antenna module and an object; and wherein the control circuitry is configured to determine that the object is within a threshold proximity of the wireless device based on the change in antenna impedance.

2. The apparatus of claim 1 wherein the adjustment to the transmit radiated power adjusts the wireless communication device to comply with RF exposure radiation limits.

3. The apparatus of claim 1 wherein the radar circuitry is configured for Continuous Wave (CW) radar or Continuous Wave Frequency Modulation (CWFM) chirped radar.

4. The apparatus of claim 1 wherein the radar circuitry is configured to operate in an Industrial, Scientific and Medical (ISM) radio band.

5. The apparatus of claim 1 wherein the transmit circuitry is configured to be coupled to at least a portion of the plurality of antenna elements; and wherein the transmit circuitry transmits the transmit radiated signal using the portion of the plurality of antenna elements.

6. The apparatus of claim 1 wherein at least a portion of the communication circuitry for phased array communications and at least a portion of the radar circuitry comprise a Radio Frequency Integrated Circuit (RFIC).

7. The apparatus of claim 1 wherein at least a portion of the one or more of the phased array antenna modules that are coupled to the communication circuitry are also coupled to the radar circuitry; and wherein the portion of the one or more of the phased array antenna modules are used to detect the return signal as a scattered portion of the transmit radiated signal.

8. The apparatus of claim 1 further comprising a transmit radar antenna coupled to the transmit circuitry and configured to radiate the transmit radiated signal, wherein the radar circuitry comprises the transmit circuitry; and a return radar antenna coupled to the radar circuitry and configured to receive the return signal.

9. The apparatus of claim 1 further comprising an RF synthesizer, wherein the RF synthesizer is configured to be used by the communication circuitry for phased array communications; and wherein the RF synthesizer is further configured to be used by the radar circuitry.

10. The apparatus of claim 1 wherein the adjustment to the transmit radiated power of the phased array communication includes a transmit power adjustment to one or more of the phased array antenna modules.

11. The apparatus of claim 1 wherein the adjustment to the transmit radiated power of the phased array communication includes a directional adjustment for one or more of the phased array antenna modules.

12. The apparatus of claim 1 wherein the communication circuitry and the radar circuitry are configured to operate simultaneously.

13. The apparatus of claim 12 wherein the transmit radiated signal comprises a data signal generated as part of the communication circuitry.

14. The apparatus of claim 1 wherein the device is a mobile wireless communication device further comprising a touchscreen interface.

15. An apparatus of a wireless communication device comprising communication circuitry configured to be coupled to one or more antenna modules;

radar circuitry configured to detect a return signal from a transmit radiated signal, wherein the transmit radiated signal is from the wireless communication device; and control circuitry to initiate an adjustment to a transmit radiated power of the wireless communication device based on the detection of the return signal by the radar circuitry;

wherein detecting the return signal comprises detecting a reflected signal caused by a change in an antenna impedance due to a near field coupling effect between the antenna module and an object.

16. The apparatus of claim 15 wherein the adjustment to the transmit radiated power configures the wireless communication device to comply with RF exposure radiation limits.

17. The apparatus of claim 15 wherein the adjustment to the transmit radiated power comprises an adjustment to a total transmit power adjustment for the wireless communication device.

18. A non-transitory computer readable medium comprising instructions that, when executed by one or more processors of a device comprising a wireless communication device, cause the wireless communication device to:

activate radar circuitry of the wireless communication device;

detect reflections from a transmit radiated signal using the radar circuitry the wireless communication device;

causes the radar circuitry to detect a portion of a return signal as a reflected signal caused by a change in antenna impedance due to a near field coupling effect with an object; and adjust a transmit radiated power generated by communication circuitry for phased array communications based on detection of the reflections associated with the object by the radar circuitry.

19. The non-transitory computer readable medium of claim 18 that further cause the radar circuitry to detect the object using the return signal using least a part of one or more phased array antenna modules.

20. The non-transitory computer readable medium of claim 18 that further causes the radar circuitry to detect an object using the return signal and at least a part of the communication circuitry.

21. A method for proximity radar detection with phased array communications in a wireless device, the method comprising:

radiating a transmit radiated signal;

detecting, using radar circuitry, a return signal from an object, wherein the return signal comprises a partial scattered portion of the transmit radiated signal from the wireless device caused by a change in antenna impedance due to a near field coupling effect, the wireless device comprising communication circuitry for the phased array communications configured to be coupled to one or more phased array antenna modules, each of the one or more phased array antenna modules comprising a plurality of antenna elements; and adjusting a transmit radiated power of the phased array communications based on the detection of the return signal by the radar circuitry.

22. The method of claim 21 further comprising:

detecting a user action using an input of the wireless device prior to radiating the transmit radiated signal;

communicating with a network via the transmitted radiated signal, wherein the transmitted radiated signal comprises a data transmission from the wireless device to the network.

23. The method of claim 22 further comprising:

adjusting a power for the data transmission as part of adjusting the transmit radiated power in response to detection of the object.

24. The apparatus of claim 15 wherein the radar circuitry is configured for Continuous Wave (CW) radar or Continuous Wave Frequency Modulation (CWFM) chirped radar.

25. The apparatus of claim 15 wherein the radar circuitry is configured to operate in an Industrial, Scientific and Medical (ISM) radio band.

* * * * *